US010628499B2

(12) United States Patent
Cain et al.

(10) Patent No.: US 10,628,499 B2
(45) Date of Patent: *Apr. 21, 2020

(54) PROVIDING HYPERLINKS IN PRESENTATIONS VIEWED REMOTELY

(71) Applicant: International Business Machines Corporation, Armonk, NY (US)

(72) Inventors: Jordan Cain, Eastleight (GB); Jack Dunning, Lyndhurst (GB); Thomas M. Fletcher, Southhampton (GB); Thomas Latham, Eastleight (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 15/688,984

(22) Filed: Aug. 29, 2017

(65) Prior Publication Data

US 2019/0065595 A1 Feb. 28, 2019

(51) Int. Cl.
*G06F 17/22* (2006.01)
*G06F 16/951* (2019.01)
(Continued)

(52) U.S. Cl.
CPC ........ *G06F 16/951* (2019.01); *G06F 16/4393* (2019.01); *G06F 16/9558* (2019.01);
(Continued)

(58) Field of Classification Search
CPC ...... G06Q 10/10; G06Q 10/107; H04L 29/06; G06F 17/2235; G06F 16/951; G06F 16/4393; G06F 16/9558
(Continued)

(56) References Cited

U.S. PATENT DOCUMENTS 6,728,753 B1 * 4/2004 Parasnis ............... G06Q 10/109
709/203
8,108,371 B2 1/2012 Dharmarajan et al.
(Continued)

FOREIGN PATENT DOCUMENTS

CN 102880709 A 1/2013
CN 104123282 A 10/2014
(Continued)

OTHER PUBLICATIONS

Cain et al., "Providing Hyperlinks in Presentations Viewed Remotely"; U.S. Appl. No. 15/802,545, filed Nov. 3, 2017.
(Continued)

*Primary Examiner* — Maikhanh Nguyen
(74) *Attorney, Agent, or Firm* — Cantor Colburn LLP; Edward Wixted

(57) ABSTRACT

Method and system for providing hyperlinks in a presentation to be viewed remotely are provided. A presenter computer system provides a presentation capable of being transmitted as presentation data to remote viewer computer systems. A display area content of a display area of the presentation is determined and link information obtained relating to one or more hyperlinks in the display area content including a link destination for each hyperlink. The link information is provided for transmission in association with the presentation data for the display area content in order to display corresponding hyperlinks at the displayed presentation at a viewer computer system.

5 Claims, 11 Drawing Sheets

(51) Int. Cl.
*H04L 29/06* (2006.01)
*G06Q 10/10* (2012.01)
*H04L 29/08* (2006.01)
*G06F 16/438* (2019.01)
*G06F 16/955* (2019.01)

(52) U.S. Cl.
CPC ....... *G06F 17/2235* (2013.01); *G06Q 10/107* (2013.01); *H04L 29/06* (2013.01); *H04L 67/02* (2013.01); *H04L 67/08* (2013.01); *H04L 67/38* (2013.01)

(58) Field of Classification Search
USPC ........................................................ 715/234
See application file for complete search history.

(56) References Cited

U.S. PATENT DOCUMENTS

| | | | |
|---|---|---|---|
| 8,108,541 | B2 | 1/2012 | Shamilian et al. |
| 9,417,765 | B1 | 8/2016 | Lewis et al. |
| 9,477,380 | B2 * | 10/2016 | Amijee ............... G06F 16/4393 |
| 9,547,631 | B1 | 1/2017 | Chitta et al. |
| 2004/0080528 | A1 * | 4/2004 | Rand ....................... G06F 16/40 715/738 |
| 2004/0119741 | A1 * | 6/2004 | Teng ........................ G09G 5/00 715/760 |
| 2009/0066722 | A1 * | 3/2009 | Kriger .................... G06Q 30/02 345/619 |

FOREIGN PATENT DOCUMENTS

| | | |
|---|---|---|
| CN | 104951521 A | 9/2015 |
| EP | 2685741 A1 | 1/2014 |
| JP | 2006011536 A | 1/2006 |
| JP | 2013149010 A | 8/2013 |

OTHER PUBLICATIONS

List of IBM Patents or Patent Applications Treated As Related; (Appendix P), Date Filed Nov. 3, 2017; 2 pages.
white pages,"Link Klipper", CodeBox, Apr. 4, 2017, p. 1.
International Search Report and Written Opinion for International Application No. PCT/IB2018/056386 with an International Filing Date of Aug. 23, 2018; dated Dec. 26, 2018; 9 pgs.
Cawley, Christian "Want to Enhance Your YouTube Videos with Clickable Links? Here's How!", Internet—https://www.makeuseof.com/tag/want-enhance-youtube-videos-clickable-links-heres/; Feb. 26, 2014; 13 pgs.
Outwit Technologies "Your Own Web Collection Engine", Internet—https://www.outwit.com/products/hub/; retrieved Aug. 8, 2019; 2 pgs.
Stack Overflow "How to tell if a DOM element is visible in the current viewport?", Internet—https://stackoverflow.com/questions/123999/how-to-tell-if-a-dom-element-is-visible-in-the-current-viewport/7557433#7557433; retrieved on Aug. 8, 2019; 31 pgs.
You Tube Help "Edit videos & video settings" Internet—https://www.makeuseof.com/tag/want-enhance-youtube-videos-clickable-links-heres/; retrieved on Aug. 8, 2019; 2 pgs.
Ziem, Andrew "Link Gopher" Internet—https://addons.mozilla.org/en-US/firefox/addon/link-gopher/; retrieved on Aug. 8, 2019; 10 pgs.

* cited by examiner

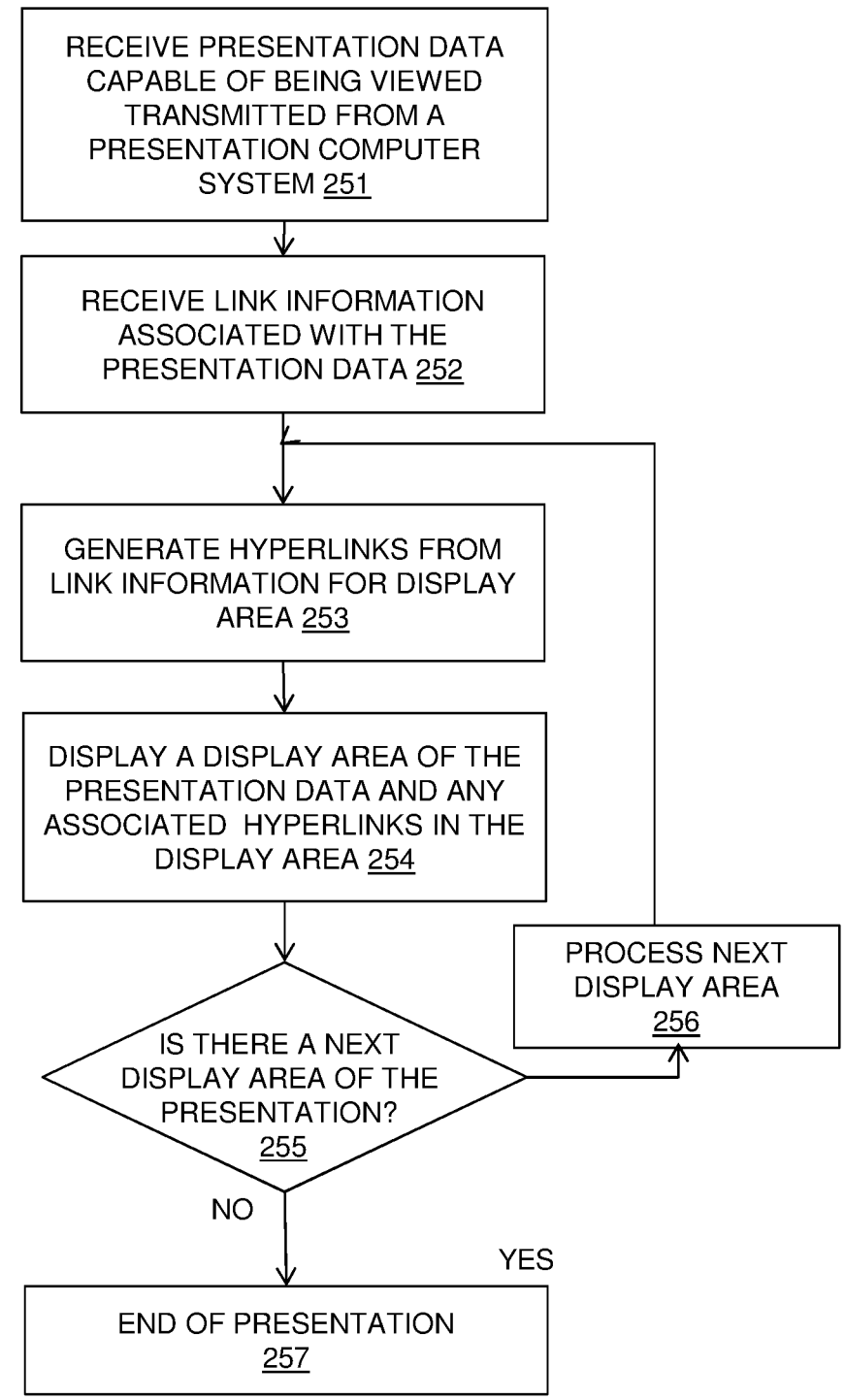

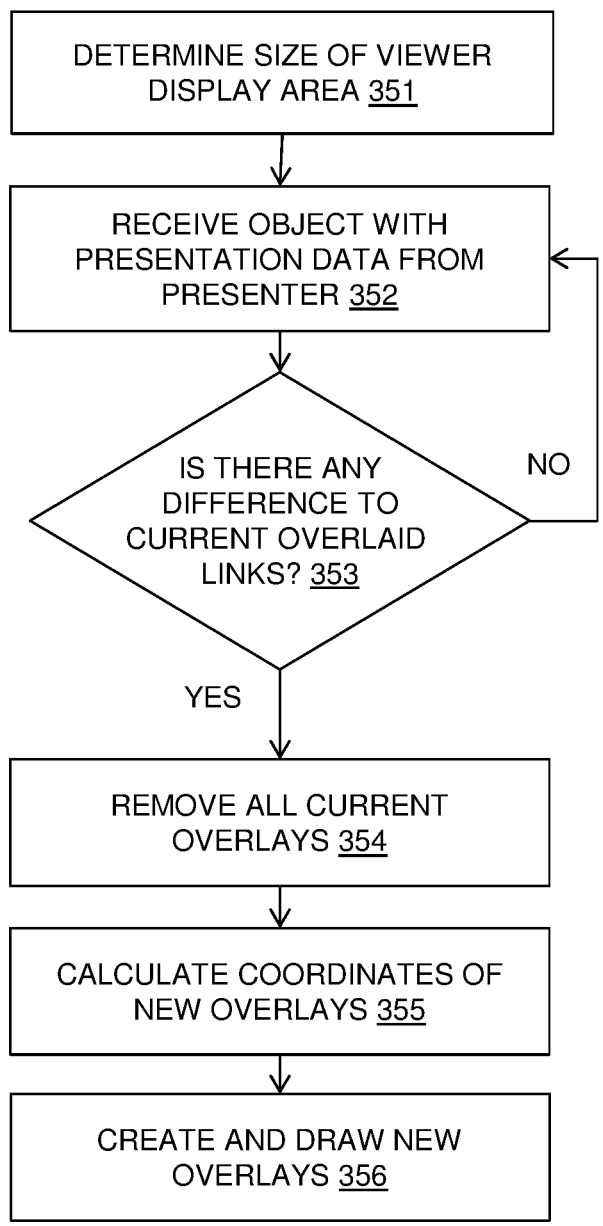

PROVIDING HYPERLINKS IN PRESENTATIONS VIEWED REMOTELY

BACKGROUND

The present invention relates to presentations provided via a network, and more specifically, to providing hyperlinks in presentations viewed remotely.

Sharing presentations via a network such as the Internet takes many different forms. Web conferencing describes online collaborative services including web seminars, webcasts, web meetings, etc. Web conferencing uses Internet technologies to provide services to allow real time, point-to-point and multicast communications from a sender to one or more receivers. Software enabling web conferencing may be run in different ways including: on web browsers, using installed conferencing software on each participant's computer, or via a hosted web service.

It often occurs that viewers of a real time, shared presentation are presented with hyperlinks on screen, often being discussed as a part of the presentation. In order to follow the hyperlinks, the viewers have to either find links themselves or interrupt the presenter to gain access to the links available. For example, a team leader may be reviewing work items in a web based workflow management system and a user may not know what a particular work item is. To find out, the user would need to open a web browser, navigate to the page being presented, and click on the work item to find more information.

Current solutions to open hyperlinks, which are shown in a live presentation of a web browser include the following. A viewer may ask the presenter for a link to the current page being shown by interrupting them on the phone or in person. A viewer may ask for a link to the current page being shown using a web meeting chat. A viewer may search for the page himself, provided he has access to the domain. The presenter may make any web pages featured in the presentation available before the presentation, for example, via email or instant messaging.

YouTube (YouTube is a trademark of Google Inc.) provides a system for adding annotations in the form of cards linking to a website from videos that have been recorded and uploaded. The system allows the user to specify a time in the video where the card should be added. When watching the video, the annotation will appear at the specified time. This requires a user to manually add cards and requires the video to already be on YouTube servers.

SUMMARY

According to an aspect of the present invention there is provided a computer-implemented method for providing hyperlinks in a presentation to be viewed remotely, the method carried out by a presenter computer system and comprising: providing a presentation capable of being transmitted as presentation data to remote viewer computer systems; determining a display area content of a display area of the presentation; obtaining link information relating to one or more hyperlinks in the display area content including a link destination for each hyperlink; and providing the link information for transmission in association with the presentation data for the display area content.

The method has the advantage of obtaining and transmitting hyperlinks in a current display area of a presentation and providing these at the remote viewer enabling the remote viewer to follow the hyperlink without interrupting the presentation. The link destination provides sufficient information for the remote user to navigate to the linked content.

Obtaining link information may include obtaining position information of each hyperlink in the display area in order to display the hyperlink as an overlay of a remote display of the presentation. The position information may include an area of an anchor of each hyperlink in the display area. The position information may be relative to the scale and aspect ratio of the display area.

This provides the advantage of the hyperlinks being overlaid at a location on the remote display corresponding to the location of the hyperlinks on the display of the presenter. The method accommodates remote displays of multiple viewers being different sizes or resolutions.

In one embodiment, providing a presentation provides a live presentation, and the link information may be obtained for each updated display area content and the link information may be transmitted sequentially with the presentation data for the updated display area content. The live presentation may be transmitted as a video presentation and the link information may be transmitted sequentially with each frame of the video presentation.

The method may include recording the live presentation and recording the sequentially transmitted link information with the presentation data enabling the link information to be provided in the recording.

In another embodiment, the method may provide a recorded presentation, and obtaining link information may include a timestamp of the one or more hyperlinks in the duration of the recorded presentation.

The presentation may be a presentation of a web browser content and obtaining link information relating to one or more hyperlinks in the display area may include obtaining link information for all hyperlinks in the web browser content and determining if each of the hyperlinks is visible in the display area of the presentation.

According to another aspect of the present invention there is provided a computer-implemented method for providing hyperlinks in a presentation to be viewed remotely, the method carried out by a viewer computer system and comprising: receiving presentation data transmitted from a presenter computer system for display of a presentation at the viewer computer system; receiving link information associated with the presentation data, wherein the link information is for one or more hyperlinks in a display area of the presentation at a presenter computer system and includes a link destination for each hyperlink; and providing hyperlinks in association with a display area of the viewer computer system displaying a display area content of the presentation.

The link information may include position information of each hyperlink in a display area of the presentation, and the method may include displaying a hyperlink as an overlay at the corresponding position of a display area of the presentation shown at the viewer computer system. The position information may be relative to the scale and aspect ratio of a display area at the presentation computer system and the method may include converting the position information to the scale and aspect ratio of the display area at the viewer computer system. The position information may include an area of an anchor of each hyperlink in the display area, and the method may include drawing an overlay of corresponding size and shape in the display area of the presentation at the viewer computer system to the area of the anchor in the display area of the presenter computer system.

This has the advantage of providing the hyperlinks at a remote viewer in the corresponding position on the presentation as shown at the presenter computer system.

The link destination may provide sufficient information for the remote user to navigate to the linked content and may include instructions on how to display the linked content, for example, in a new tab or window.

In one embodiment, receiving presentation data receives a live presentation, and the link information is received sequentially with the presentation data. In another embodiment, receiving presentation data receives a recording of a live presentation including sequentially transmitted link information with the presentation data. In these embodiments, the method may include receiving updated link information and determining if there is a difference to currently displayed hyperlinks and, if so, replacing current displayed hyperlinks with new hyperlinks based on the updated link information.

In a further embodiment, receiving presentation data may receive a recorded presentation in the form of presentation data, and receiving link information may receive link information for one or more hyperlinks including a timestamp in the duration of the recorded presentation at which a hyperlink is to be displayed, and providing the one or more hyperlinks may provide the hyperlinks at the time of the timestamp in the presentation.

According to a further aspect of the present invention there is provided a system for providing hyperlinks in a presentation to be viewed remotely, the system is provided at a presentation computer system including a processor and memory configured to provide computer program instructions to the processor to execute the function of components and including a presentation component providing a presentation capable of being transmitted as presentation data to remote viewer computer systems, the system comprising: a display area component for determining a display area content of a display area the presentation; a link obtaining component for obtaining link information relating to one or more hyperlinks in the display area content including a destination obtaining component for obtaining a link destination for each hyperlink; and a link transmission component providing the link information for transmission in association with the presentation data for the display area content.

The system may be provided as an extension to a web browser used for presentations or other presentation components such as applications or web services.

The link obtaining component may include a link position component for obtaining position information of each hyperlink in the display area in order to display a hyperlink as an overlay of a remote display of the presentation. The position information may include an area of an anchor of each hyperlink in the display area. The position information may be relative to the scale and aspect ratio of the display area as determined by a display area component.

In one embodiment, the presentation component may provide a live presentation, and wherein the link obtaining component may obtain link information for each updated display area content and the link transmission component may transmit the link information sequentially with the presentation data for the updated display area content. A recording component may be provided for recording the live presentation and recording the sequentially transmitted link information with the presentation data enabling the link information to be provided in the recording.

In another embodiment, the presentation component provides a recorded presentation, and wherein the link obtaining component may include a timestamp component for including a timestamp in the link information of a time in the duration of the recorded presentation at which the link is referenced.

The presentation may be a presentation of a web browser content and a web browser plugin may provide the functionality of the link obtaining component, and the web browser plugin may include: a link scanning component to scan an open web browser content for all hyperlinks in the web browser content; and a viewable link component determines if each of the hyperlinks is visible in a current display area of the presentation.

According to a further aspect of the present invention there is provided a system for providing hyperlinks in a presentation to be viewed remotely, the system is provided at a viewer computer system including a processor and memory configured to provide computer program instructions to the processor to execute the function of components and including a displaying component for receiving presentation data transmitted from a presenter computer system for display at the viewer computer system, the system comprising: a link receiving component for receiving link information associated with the presentation data, wherein the link information is for one or more hyperlinks in a display area of the presentation at a presenter computer system and includes a link destination for each hyperlink; and a link displaying component providing hyperlinks in association with a display area of the viewer computer system displaying a display area content of the presentation.

The link receiving component may receive link information including position information of each hyperlink in a display area of the presentation, and the link displaying component may include an overlay drawing component for displaying a hyperlink as an overlay at a position of the display area of the viewer computer system corresponding to a position of the hyperlink in the display area of the presenter computer system.

The position information may include an area of an anchor of each hyperlink in the display area of the presentation, and the overlay drawing component may draw an overlay of corresponding size and shape in the display area of the presentation at the viewer computer system to the area of the anchor in the display area of the presenter computer system.

The link displaying component may include a position conversion component for converting the position information to a scale and aspect ratio of the display area at the viewer computer system.

According to a further aspect of the present invention there is provided a computer program product for providing hyperlinks in a presentation to be viewed remotely, the computer program product comprising a computer readable storage medium having program instructions embodied therewith, the program instructions executable by a processor to cause the processor to: provide a presentation capable of being transmitted as presentation data to remote viewing systems; determine a display area content of a display area of the presentation; obtain link information relating to one or more hyperlinks in the display area content including a link destination for each hyperlink; and provide the link information for transmission in association with the presentation data for the display area content.

According to a further aspect of the present invention there is provided a computer program product for providing hyperlinks in a presentation to be viewed remotely, the computer program product comprising a computer readable storage medium having program instructions embodied therewith, the program instructions executable by a processor to cause the processor to: receive presentation data transmitted from a presenter computer system for display of a presentation at the viewer computer system; receiving link information associated with the presentation data, wherein the link information is for one or more hyperlinks in a display area of the presentation at a presenter computer system and includes a link destination for each hyperlink, and provide hyperlinks in association with a display area of the viewer computer system displaying a display area content of the presentation.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which:

FIG. 2B is a flow diagram of an example embodiment of another aspect of a method in accordance with the present invention carried out by a viewer computer system;

FIG. 3B is a flow diagram of a further exemplary embodiment of another aspect of a method in accordance with the present invention carried out by a viewer computer system;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described system and method enable hyperlinks in presentations to be transmitted to one or more viewers of the presentation via a network. A presentation may be broadcast or shared with remote viewers via network communication and may be shared as a live presentation in real time, as a recording of a live presentation, or as a pre-recorded presentation. A hyperlink may be a Hypertext Transfer Protocol (HTTP) link or Hypertext Transfer Protocol Secure (HTTPS) link in the form of direct target Uniform Resource Locators (URLs).

The link information including the link destination of the hyperlinks is obtained for hyperlinks in a screen display area in view in the presentation at a presenter computer system. The link information may be transmitted sequentially with the presentation data or, alternatively, the link information may be associated with the presentation data by reference to timestamps in the duration of the presentation.

The link information may be received at a viewer computer system and displayed as hyperlinks for activation by a remote viewer. The hyperlinks may be displayed at the same time as the screen display area of the presentation, adjacent to the display area or as overlays to the display area of the presentation.

Figure 1:
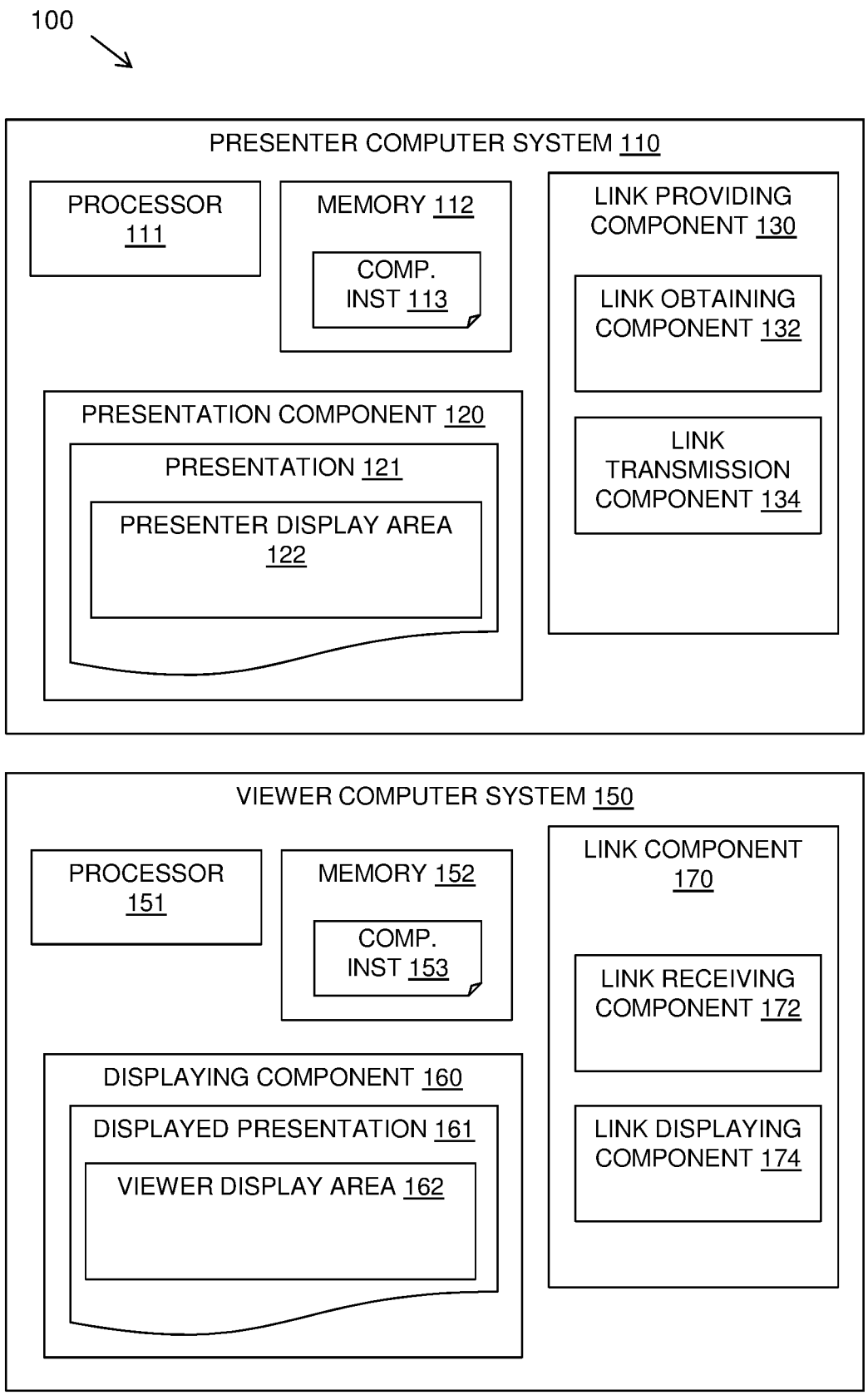
FIG. 1 is a block diagram of an example embodiment of a system in accordance with the present invention.

Referring to FIG. 1, a block diagram shows an example system 100 in which the described system and method may be implemented. A presenter computer system 110 may include at least one processor 111, a hardware module, or a circuit for executing the functions of the described components which may be software units executing on the at least one processor. Memory 112 may be configured to provide computer instructions 113 to the at least one processor 111 to carry out the functionality of the components.

The presenter computer system 110 may include a presentation component 120 for providing a presentation 121 via a network conferencing method. The presentation component 120 may be, for example, a web browser, conferencing software installed on the presenter computer system 110 with corresponding software on each viewer computer, a hosted web service, etc.

At a given time in the presentation 121, a presenter display area 122 may be on view. The presentation may be a video, a web page, a series of slides, or other media content provided during a transmitted presentation. This presenter display area 122 may be a frame in a video presentation, or the contents of a window of a browser application, a presentation program slide, or a portion of a slide if the presenter zooms in to give a detailed view, etc.

Conferencing may allow real time or recorded point-to-point communications or multi-cast communications from one sender to many receivers. It may provide presentations to be shared simultaneously across geographically dispersed locations. In general, web conferencing is made possible by Internet technologies, particularly on Transmission Control Protocol/Internet Protocol (TCP/IP) connections. Presentations may also be shared on private or corporate networks. Applications for conferencing providing presentations include meetings, training events, lectures, etc. from a network connected computer to other network connected computers.

Multiple viewer computer systems 150 may view the presentation 121 supplied by the presenter computer system 110. A viewer computer system 150 may include at least one processor 151, a hardware module, or a circuit for executing the functions of the described components which may be software units executing on the at least one processor. Memory 152 may be configured to provide computer instructions 153 to the at least one processor 151 to carry out the functionality of the components.

A viewer computer system 150 may include a displaying component 160 for showing a displayed presentation 161 via a network conferencing method. The displaying component 160 may be, for example, a web browser, conferencing software installed on the viewer computer system 150, a hosted web service, etc. At a given time in the displayed presentation 161, a viewer display area 162 may be on view.

This viewer display area 162 may correspond to the presenter display area 122 and may be a frame in a video presentation, or the contents of a window of a browser application, a presentation program slide, or a portion of a slide if the presenter zooms in to give a detailed view, etc. However, the viewer display area 162 may be a different resolution, size, or ratio compared to the presenter display area depending on the displaying component 160 of the viewer computer system 150. Different viewers of the same presentation 121 may have different viewer display areas 162.

The described system provides a link providing component 130 at the presenter computer system 110 for providing details of viewable hyperlinks in the presenter display areas 122 of the presentation 121 and transmitting these with the presentation 121 to a corresponding link component 170 at a viewer computer system 150.

The link providing component 130 may include a link obtaining component 132 for obtaining link information from the presentation 161 and a link transmission component 134 for transmitting the link information to a viewer computer system 150. The link component 170 may include a link receiving component 172 for receiving the link information with the presentation 121 and a link displaying component 174 for displaying hyperlinks generated from the link information on or in association with the displayed presentation 161 at the displaying component 160. Further details of these components are described below.

The described method and system operate for a particular display area in view at a given time in a presentation and enable the hyperlinks in the display area to be obtained and provided at one or more viewer computer systems.

Figure 2A:
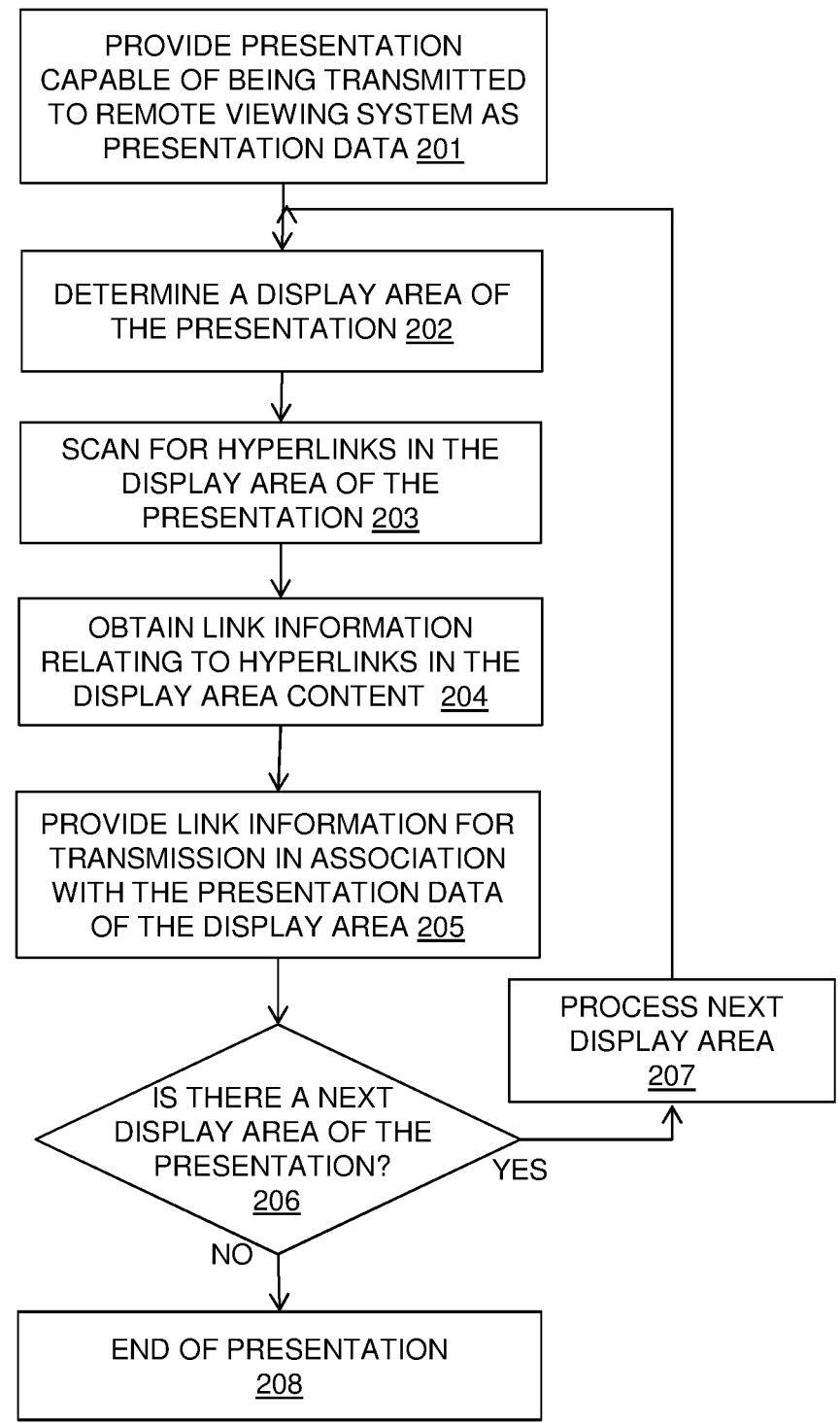
FIG. 2A is a flow diagram of an example embodiment of an aspect of a method in accordance with the present invention carried out by a presenter computer system.

Referring to FIG. 2A, a flow diagram 200 shows an example embodiment of an aspect of the described method for providing hyperlinks in a presentation. The method is carried out by a presenter computer system, which may be, for example, a personal computer, a server, or a cloud based server.

The method provides 201 a presentation capable of being transmitted to one or more remote viewing systems as presentation data. In one embodiment, the presentation may be transmitted as a live presentation that is streamed as display frames at a rate per second. In another embodiment, the presentation may be a recording of a previously transmitted live presentation, where the live transmission has been recorded at the presenter computer system as it has been transmitted live and the recording may be transmitted at a later date or dates. In a further embodiment, the presentation may be a pre-recorded presentation that is recorded during production of the presentation for transmission only as a pre-recorded presentation.

The method may determine 202 a display area of the presentation. This may be the window of the presentation shown by the presenter at a given time. In some embodiments, such as live presentations, the contents of the display area may change rapidly (such as by a number of frames per second), whilst in other embodiments, this may remain the same for a longer period of time. In one example, the presentation may be provided from a web browser showing an area of a website and the presentation may scroll through the website or may move between pages of the website, and each time the viewable display area changes the contents of the display area may be updated. If the presentation of the website is a live presentation, the website may be sent as a video of a number of frames per second and may be constantly updated.

For a determined display area, the content may be scanned 203 to identify hyperlinks in the display area. Hyperlinks may be provided in a presentation that may be followed by activating the hyperlink by clicking, tapping, or hovering with a cursor at the anchor of the hyperlink in the presentation. The activation of a hyperlink may navigate or browse to the linked document or another resource. In one embodiment, in which the display area is a display window of a web browser, the hyperlinks may be identified by scraping details of all viewable hyperlinks using a plugin to the web browser.

Link information for the identified hyperlinks may be obtained 204. The link information may include the link destination.

The link information may also include the size and location of the anchor of the hyperlink in the display area of the presentation. The anchor in the presentation may be anchor text or an image. The area of the anchor may be defined by coordinates in the display area of the presentation.

For recorded presentations, the link information may include metadata relating to the location and/or time of the hyperlinks in the presentation, which may enable the relevant hyperlinks to be associated with a display area.

The link information may be provided 205 for transmission in association with the presentation data of the display area. This may be streamed with the presentation data or may be sent separately with a reference to the location or time in the presentation data. The link information may be provided as link objects for transmission that may be used by a viewer computer system for displaying corresponding hyperlinks.

It may be determined 206 if there is a next display area of the presentation. If there is a next display area, the method may loop to process 207 the next display area when this is available. If there is no next display area, the presentation ends 208.

The presenter may change the size or aspect ratio of the display area during the presentation. If this occurs, a corresponding alteration to the position information for hyperlinks displayed as overlays at the viewer computer system may be carried out.

Referring to FIG. 2B, a flow diagram 250 shows an example embodiment of an aspect of the described method for providing hyperlinks in a presentation. The method is carried out by a viewer computer system.

The viewer computer system may receive 251 presentation data capable of being viewed as transmitted from a presentation computer system and may receive 252 link information associated with the presentation data. The link information may be received streamed with the presentation data or may be sent separately with a reference to the location or time in the presentation data.

The viewer computer system may generate 253 hyperlinks from the link information received from the presentation computer system for a display area. The link information may be received as link objects that may be used to generate the hyperlinks.

The link information may include destination information that may form the target of the hyperlink.

The link information may also include size and location information of a hyperlink in the display area of the presentation that may be converted to a corresponding size and location of an anchor in the display area of the viewer display area.

For recorded presentations, the link information may include metadata relating to the location and/or time of the hyperlinks in the presentation, which may enable the relevant hyperlinks to be associated with a display area.

The viewer computer system may display 254 a current display area of the presentation data and any associated hyperlinks that are in the display area of the presentation. The hyperlinks may be displayed adjacent the viewer display area, for example in an area of a window adjacent the display as a list of operable hyperlinks. Alternatively, the hyperlinks may be displayed in corresponding size and location over the viewer display area as an overlay that includes activation control of the hyperlinks.

The viewer computer system currently displaying the presentation may display generated hyperlinks in association with the presentation stream such that the viewer can access the hyperlinks within the displayed presentation.

Activation and opening of a hyperlink at the viewer computer system may display the target destination in a number of ways. The target destination may be opened and displayed as a new tab in a window, as a new window, as a transclusion in the presentation display, or any other configurable option. The hyperlink may include a specific instruction on how to open the target destination.

It may be determined 255 if there is a next display area of the presentation. If there is a next display area, the method may loop to process 256 the next display area when this is available. If there is no next display area, the presentation ends 257.

The described method and system identifies hyperlinks currently on view in a presentation and transmits information or objects defining the hyperlinks to displaying components on viewer computer systems. The hyperlink objects are used to create hyperlinks in the display of the presentation at the viewer computer. The size of the hyperlink anchors may be adapted to suit the displayed presentation resolution at the viewer computer system.

This has the benefit that the presentation is not interrupted and websites used in the presentation do not need to be made available prior to the presentation. If a user wants to read more about something on-screen after the presentation they can open the target destination of the hyperlink as it appears and continue watching the presentation enabling them to review the target destination of the hyperlink at a later time.

Figure 3A:
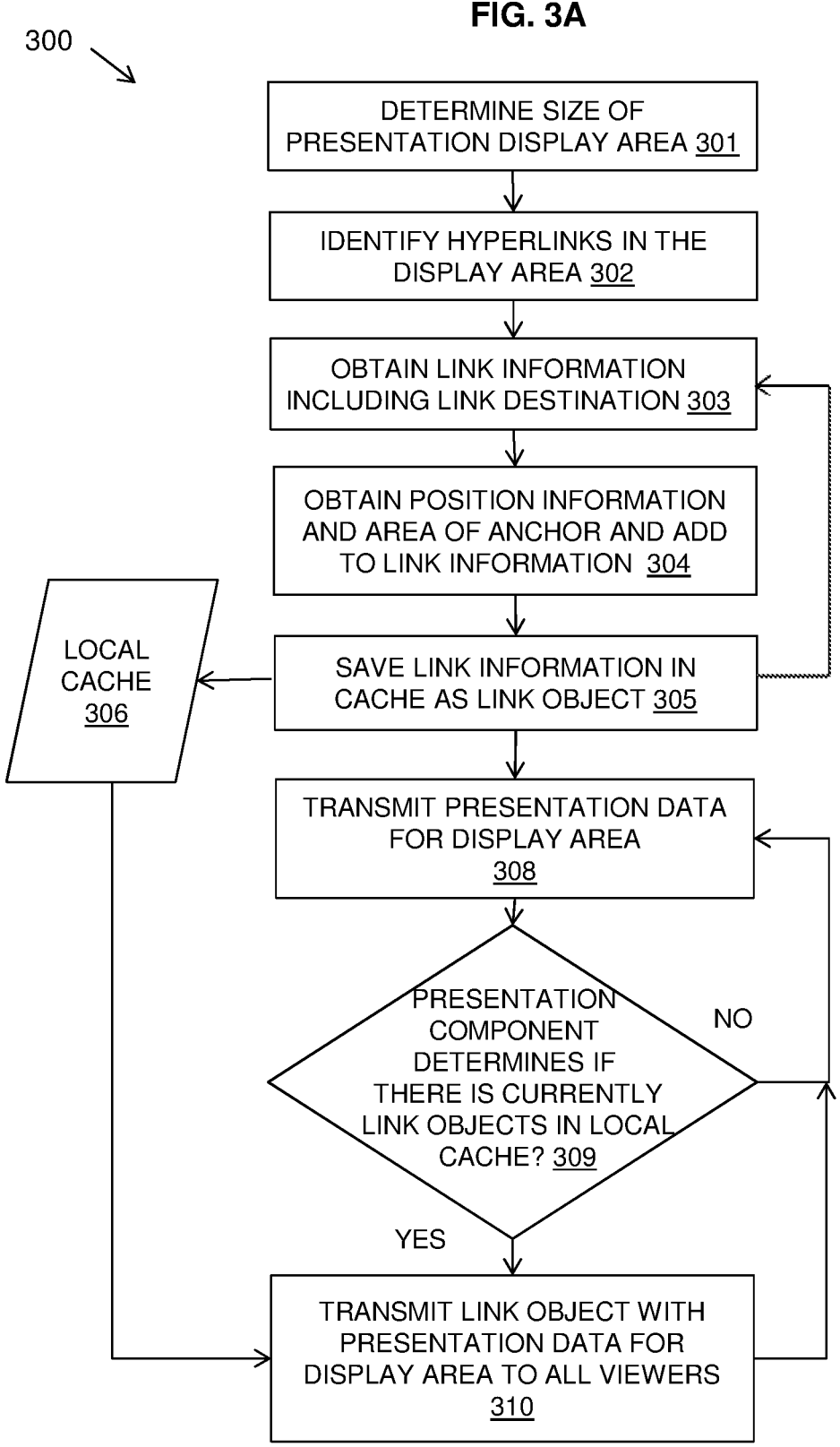
FIG. 3A is a flow diagram of a further exemplary embodiment of an aspect of a method in accordance with the present invention carried out by a presenter computer system.

Referring to FIG. 3A, a flow diagram 300 shows an example embodiment of an aspect of the described method carried out at the presenter computer system 110 in which the presentation is a real time presentation in the form of a video stream transmission at a rate of frames per second of a web browser of a presenter.

This embodiment is intended for traditional web browser content and when presenting only the web browser content will be transmitted to the viewers, even if the presenter switches to another application. This is similar to how some screen sharing software applications allow a presenter to choose which application to present to viewers and only that application's content is transmitted.

A link providing component 130 may determine 301 the size of the display area of the presentation window of the web browser. This may be measured in pixels.

Hyperlinks may be identified 302 in the display area. This may identify all hyperlinks in a web page and may determine if each hyperlink is currently viewable in the display area that is the currently presented version of the presentation.

The hyperlinks in a web page may be identified by scraping the website being shown. For example, this embodiment may use a web browser plugin to search or scrape the page source (HTML) of the current page for all the anchor tags (<a> <a/>).

A web page is generally larger than a viewport or display area. A user may navigate by using a scroll bar to access and display off-screen areas. In a presentation, the presenter may navigate around the web page being displayed in the web browser by scrolling up and down and left to right.

The method may find all the hyperlinks on the current web page through scraping, yet only a portion of the web page (the viewport or display area) may be visible at a time. Therefore, it may also be determined which hyperlinks are currently in the display area or viewport and are in view in the presentation. Hyperlinks are not visible when they are not on screen in the browser window.

Link information for each identified hyperlink in the display area may be obtained 303 including a link destination in the form of a URL.

In this embodiment, the hyperlinks are to be overlaid on the displayed presentation at the viewer computer system and therefore the method obtains 304 position information of the hyperlink in the display area and details of the anchor area of the hyperlink. For example, the hyperlink may be a string of text with the anchor area being the area of the text. In another example, the hyperlink anchor may be an image and the anchor area may be the shape of the outline of the image.

In this way, the link information may be obtained and preserved for currently viewable hyperlinks in the display area. This data may be saved 305 in a local cache 306 as an object together with or including the position of the link in the display area. The method may continue to identify hyperlinks in a current display area such that the link objects in the local cache 306 are updated as the presentation runs.

The presentation data may be uploaded or transmitted 308 for a current display area and, as it transmits, the method may determine 309 if there is currently data in the local cache 306 for the display area being uploaded or transmitted. If there is no data in the local cache, the method may continue to transmit 308 presentation data whilst determining if there are link objects for a next content of the display area.

For a real time presentation, the local cache 306 may be checked at the same rate as the video being uploaded. So if the presentation video is at 28 frames per second (fps), the local cache 306 may be checked and updated 28 times per second.

If there is one or more link object in the local cache 306 for a display area content, the link objects may be uploaded or transmitted 310 with the presentation data to all the viewers. The method may then continue to transmit 308 a next display area content and newly added link objects from the local cache 306.

For this embodiment, the link objects do not require time stamps as the automated process to collect the video data (the images to transmit) and the display area link objects, does so sequentially and transmits them at the same time. This may be as a pair or as a single piece of data. This means that the viewer computer system may receive a single piece of data or, if a pair, both pieces of data at once and so process them as a linked pair.

Referring to FIG. 3B, a flow diagram 350 shows an example embodiment of an aspect of the described method carried out at the viewer computer system 150 in which the presentation is a real time presentation in the form of a video stream transmission at a rate of frames per second of a web browser of a presenter. This embodiment corresponds to the method of FIG. 3A and is intended for traditional web browser content.

A link receiving component at a viewer computer system may determine 351 a size of a viewer display area window at the viewer computer system 150. The link receiving component 170 may receive 352 presentation data with any link objects for a current content of a display area from the presenter computer system 110.

The presentation data and link objects may be received sequentially as a pair or as a single piece of data. This means that the viewer computer system may receive a single piece of data or, if a pair, both pieces of data at once and so process them as a linked pair.

It may be determined 353 if there is any difference to currently overlaid hyperlinks in the current content of the display area of the displayed presentation. If there is no difference, the method may wait to receive a next display area content presentation data with link objects from the presenter computer system.

This is an ongoing check that checks at the same rate as the frames per second as the only time that overlay may change is between frames.

If there is a difference, the method may remove 354 all current overlays. The method may calculate 355 coordinates of a new overlay for providing a hyperlink at the viewer computer program and may create and draw 356 the new overlay on the displayed presentation 161.

The overlay provides a hyperlink at the corresponding location on the display area 162 of the displayed presentation 161 to that of the original link in the display area 122 of the presentation 121 at the presenter computer system 110. The hyperlink at the viewer computer system 150 may be activated by clicking directly on the displayed presentation 161 to open the hyperlink. The hyperlink may be opened in a separate window of a web browser, a separate tab, or other configured location at the viewer computer system 150.

If the method does not overlay the hyperlinks on top of the presentation, a section may be available on the display component with a list of currently visible hyperlinks in the display area. This could be in the form of the text that is visible on screen and have the URL alongside each, for example, Google—https://www.google.co.uk (Google is a trademark of Google Inc.).

In another embodiment, a real time presentation as described in the example illustrated by FIG. 3A and FIG. 3B may be recorded at the presenter computer system 110 for later transmission on demand.

In this embodiment, a recording component may be provided at the presenter computer system 110 that may be part of the presentation component 120 or a separate component.

The recording component may capture the link information together with the presentation data and it may be recorded as a single data item or data pair. The recording component may record a timestamp of each hyperlink's link information in the presentation stream to ensure it is associated with a correct display area content of the presentation.

When transmitting a recorded real time presentation, the position of the hyperlinks, the time they are in the display area, and the destination they point to may be stored alongside the recorded presentation data and when the presentation data is played back the same formulas could be applied to draw the links that are used for real time transmission.

On the viewer computer system 150, the displaying component 160 may include the link receiving component 170 for receiving and drawing overlays for the hyperlinks.

In a further embodiment, the presentation 121 may be pre-recorded and is recorded during production of the presentation for transmission only as a pre-recorded presentation (i.e. not a recording of a real time presentation).

This embodiment requires a method of storing metadata regarding the hyperlinks alongside the presentation and when played at a viewer computer system 150, the displaying component 160 may read and render the links on top of the presentation in the same way as described for real time presentations. The metadata may include: the destination information of the hyperlink in the form of the URL the link points to; coordinates of the hyperlink position; and the time period the hyperlink needs to be displayed in the presentation.

Figure 4A:
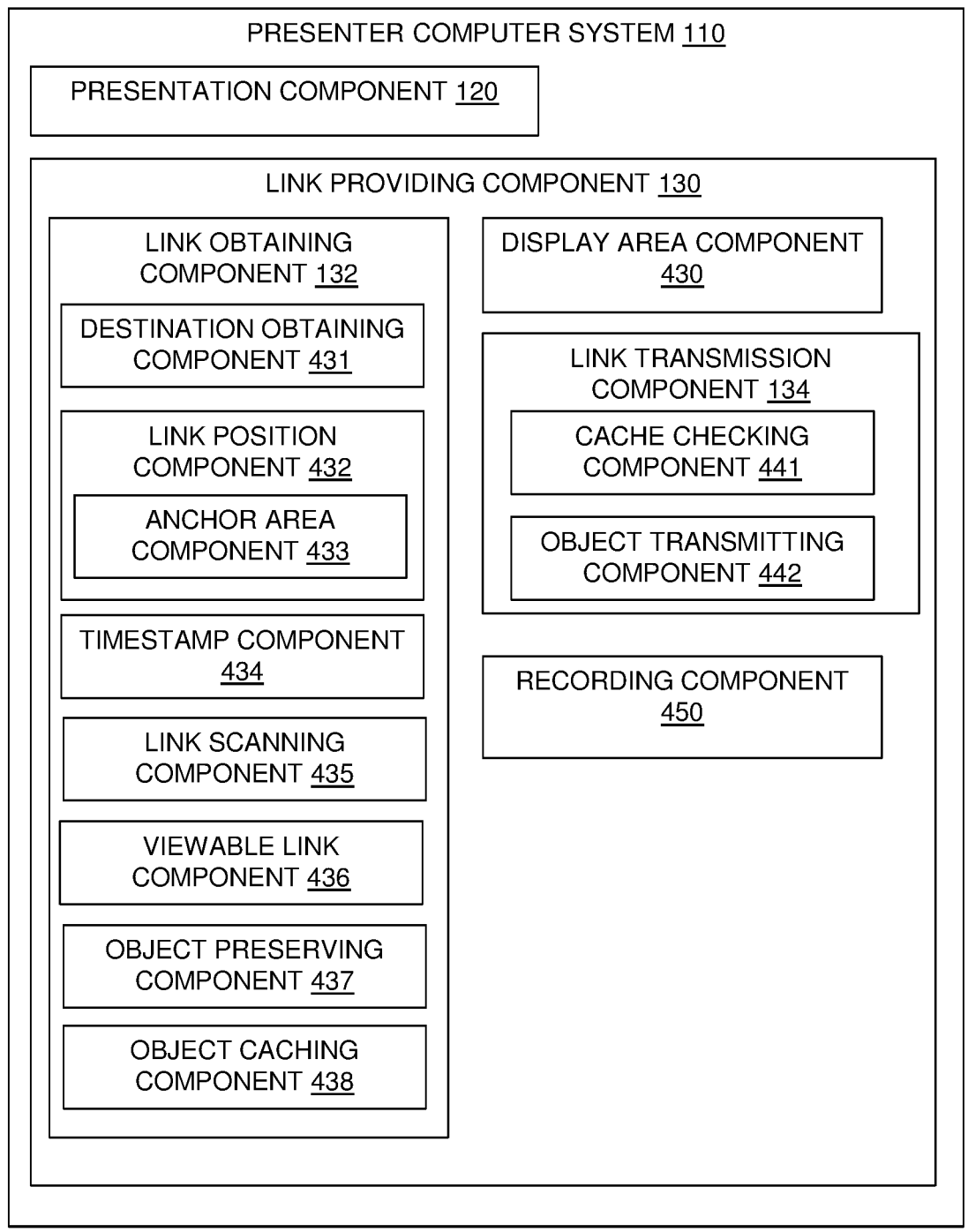
FIG. 4A is a block diagram of an example embodiment of an aspect of a system in accordance with the present invention.

Referring to FIG. 4A, a block diagram shows further components of an example embodiment of the link providing component 130 of the presenter computer system 110 provided in association with a presentation component 120 as shown in FIG. 1.

The link providing component 130 may include a display area component 430 for determining a display area content of a display area the presentation being presented by the presentation component 120. The display area component 430 may also determine a size of a display area, which may include the resolution and aspect ratio.

The link providing component 130 may include a link obtaining component 132 for obtaining link information relating to one or more hyperlinks in the display area content. The link obtaining component 132 may include a destination obtaining component 431 for obtaining a link destination for each hyperlink.

In embodiments in which the hyperlinks are provided as overlays on the displayed presentation at a remote viewer computer system 150, the link obtaining component 132 may include a link position component 432 for obtaining position information of each hyperlink in the display area. The link position component 432 may include an anchor area component 433 for obtaining information relating to an area of an anchor of each hyperlink in the display area.

The link providing component 130 may include a link transmission component 134 providing the link information for transmission in association with the presentation data for the display area content.

In one embodiment, the presentation component 120 may provide a live presentation and the link obtaining component 132 may include obtaining link information for each updated display area content. The link transmission component 134 may transmit the link information sequentially with the presentation data for the updated display area content. A recording component 450 may be provided at the link providing component 130 for recording the live presentation and recording the sequentially transmitted link information with the presentation data enabling the link information to be provided in the recording.

In another embodiment, the presentation component 120 may provide a recorded presentation, and the link obtaining component 132 may include a timestamp component 434 for including a timestamp in the link information of a time in the duration of the recorded presentation at which the link is referenced.

In one embodiment, the presentation component 120 may be a web browser and the presentation may be a presentation of a web browser content. The link providing component 130 may be a web browser plugin providing the functionality of the link obtaining component 132. The link obtaining component 132 may include: a link scanning component 435 to scan an open web browser content for all hyperlinks in the web browser content, and a viewable link component 436 to determine if each of the hyperlinks is visible in a current display area of the presentation.

An implementation of the link providing component 130 may include an object preserving component 437 for creating objects for the link information for each hyperlink and caching the objects at a local cache using an object caching component 438. This may be used, for example, when obtaining link information in a live presentation where the objects are cached at each frame of the presentation. The link transmission component 134 may include a cache checking component 441 for checking the local cache and an object transmitting component 442 for transmitting the objects to the remote viewer computer systems 150.

Figure 4B:
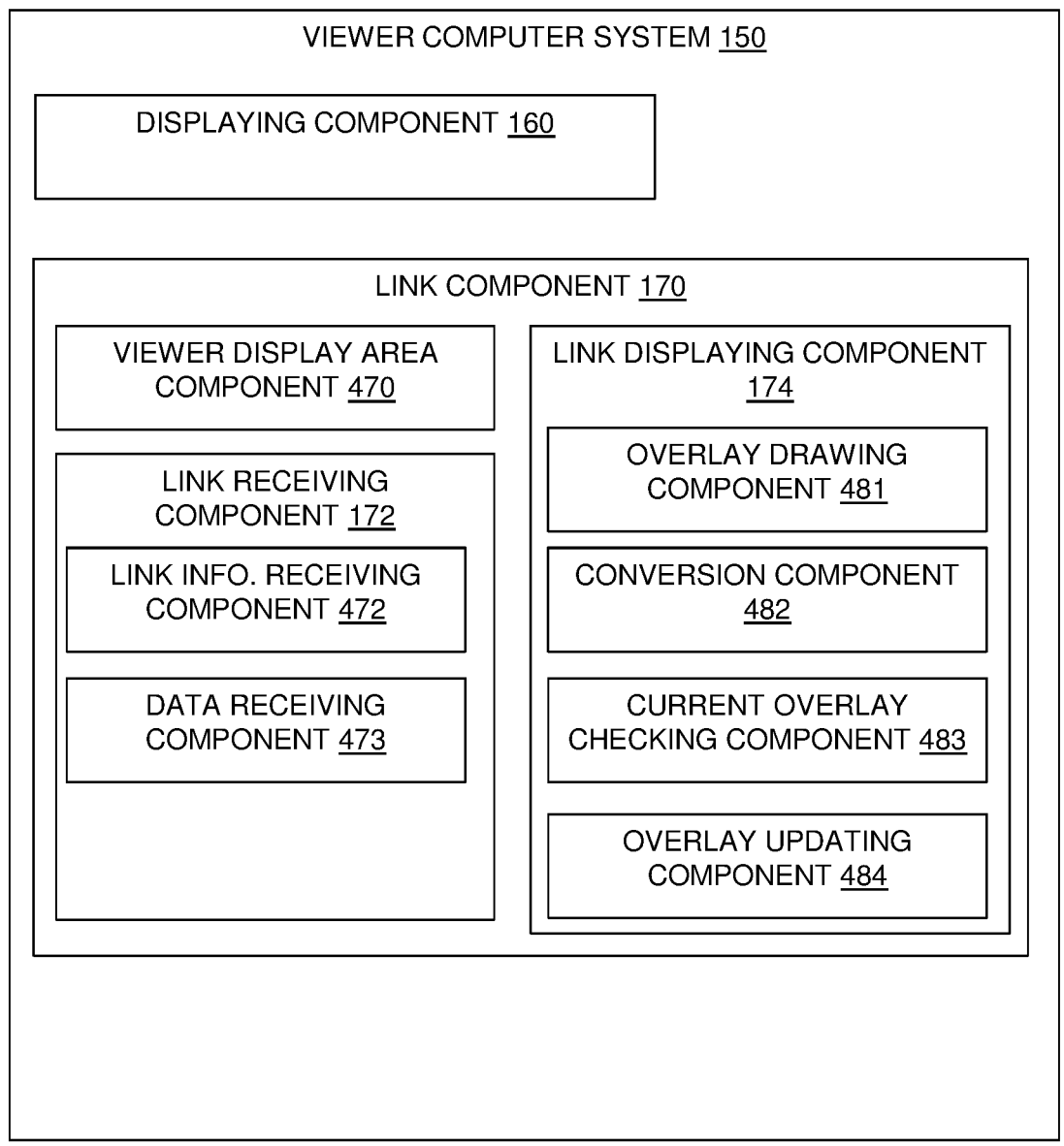
FIG. 4B is a block diagram of an example embodiment of another aspect of a system in accordance with the present invention.

Referring to FIG. 4B, a block diagram shows further components of an example embodiment of the link component 170 of the viewer component system 150 provided in association with a displaying component 160 as shown in FIG. 1.

The link component 170 may include a link receiving component 172 including a link information receiving component 472 which may operate in conjunction with a data receiving component 473 for receiving the presentation data. The link information receiving component 472 may receive link information for one or more hyperlinks in a display area of the presentation at a presenter computer system 110 including a link destination for each hyperlink.

The link component 170 may include a link displaying component 174 for providing hyperlinks in association with a display area of the viewer computer system 150 displaying a display area content of the presentation. The link displaying component 174 may display the hyperlinks in a panel or window adjacent the display area at the viewer computer system 150 or as overlays over the display area.

The link receiving component 172 may receive link information including position information of each hyperlink in the display area of the presentation, and the link displaying component 174 may include an overlay drawing component 481 for displaying a hyperlink as an overlay at a position of the display area of the viewer computer system 150 corresponding to a position of the hyperlink in the display area of the presenter computer system 110.

The position information may include an area of an anchor of each hyperlink in the display area of the presentation, and the overlay drawing component 481 may draw an overlay of corresponding size and shape in the display area of the presentation at the viewer computer system 150 to the area of the anchor in the display area of the presenter computer system 110.

The link component 170 may include a viewer display area component 470 for determining a size of a display area at the viewer computer system 150 and the link displaying component 174 may include a conversion component 482 for converting the position information to a scale and aspect ratio of the display area at the viewer computer system 150.

The link displaying component 174 may include a current overlay checking component 483 for checking if a current overlay has been updated and an overlay updating component 484 for updating overlays.

The link providing component 130 of the presenter computer system 110 and the link component 170 of the viewer computer system 150 may be provided by various implementations.

In one example, the presentation component 120 and the displaying component 160 may be web browsers and the link providing component 130 and the link component 170 may be plugins to the web browsers.

In another example, the presentation component 120 and the displaying component 170 may be web service conferencing application and the link providing component 130 and the link component 170 may be extensions to the web service.

In a further example, the presentation component 120 and the displaying component 170 may be downloaded conferencing applications and the link providing component 130 and the link component 170 may be extensions to the applications. This implementation may perform all the actions by loading the URL in its own application and scraping the links in the same method as described above. This may include a mobile application for a viewing mobile device.

A specific example embodiment is now described with the presentation component 120 in the form of a web browser. A web browser plugin may use a library such as jQuery (jQuery is a trademark of JS Foundation, Inc.), which is a cross-platform JavaScript (JavaScript is a trademark of Oracle Corporation) library designed to simplify the client-side scripting of Hypertext Markup Language (HTML). As jQuery is a JavaScript library, a native JavaScript implementation may be produced as an alternative.

The HTTP links in a web page used for a presentation by the web browser may be provided within an anchor element where an anchor element is a piece of text that marks the beginning and/or end of a hypertext link.

For example, an anchor element may be:
<a href="www.google.co.uk">Google</a>).

The tag <a begins the anchor element which has a single property for the linked resource (URL) which is set using the href=www.google.co.uk key value pair. The text shown on the website is contained between the opening <a> tag and closing </a> tag.

The plugin may work out if the links are currently viewable on the display area using JQuery/JavaScript and only these links may be preserved. For example, this may be done by using Element.getBoundingClientRect( ) method that returns the size of an element and its position relative to the viewport.

Each preserved link and its corresponding position (x,y) may be sent as a JavaScript Object Notation (JSON) object to each of the viewing clients. They may be sent separately or with the presentation data, such as video packets.

The viewing client's link receiving component may read the JSON data and scale the coordinates received based on the aspect ratio and size of the display in use at the viewer client. This then allows the displaying component to overlay an HTTP link on the presentation such as a video feed. The hyperlinks may be provided such that a client can click directly on the hyperlinks that appear on the screen, as if they are interacting directly with the presenter's computer, for example, opening the links in a new tab in the browser.

The described method sends the JSON link data along with a video stream such that the client's displaying component of the presentation software can process it to allow users to click directly within a live video to open an HTTP link.

Figure 5:
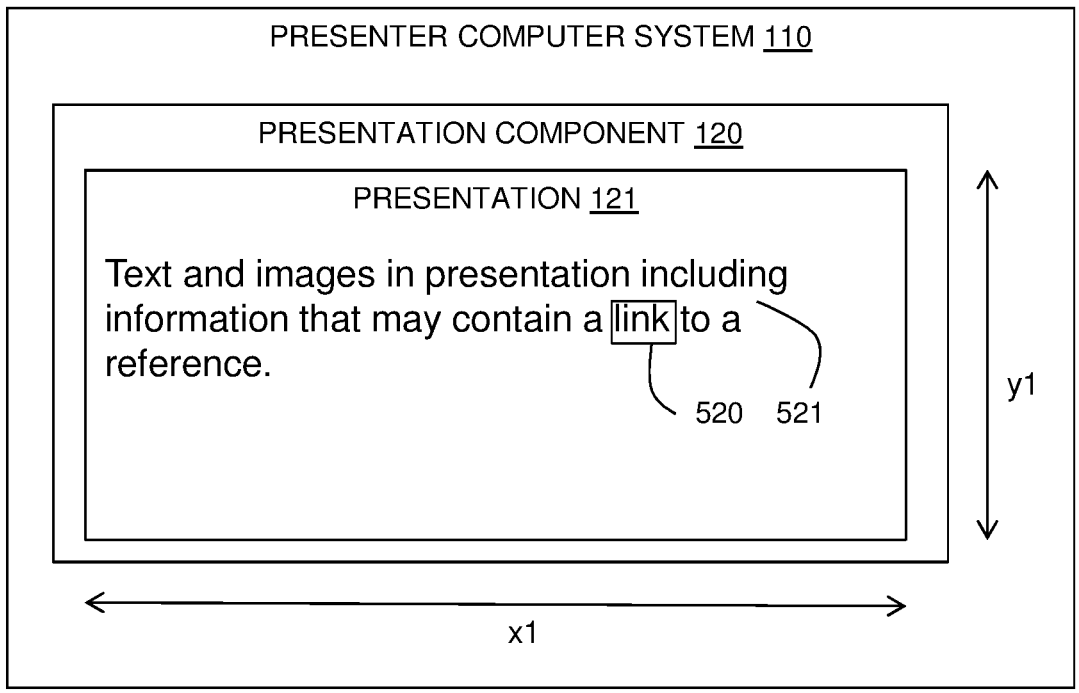
FIG. 5 is a schematic diagram illustrating a shared presentation in accordance with the present invention.
Figure 5:
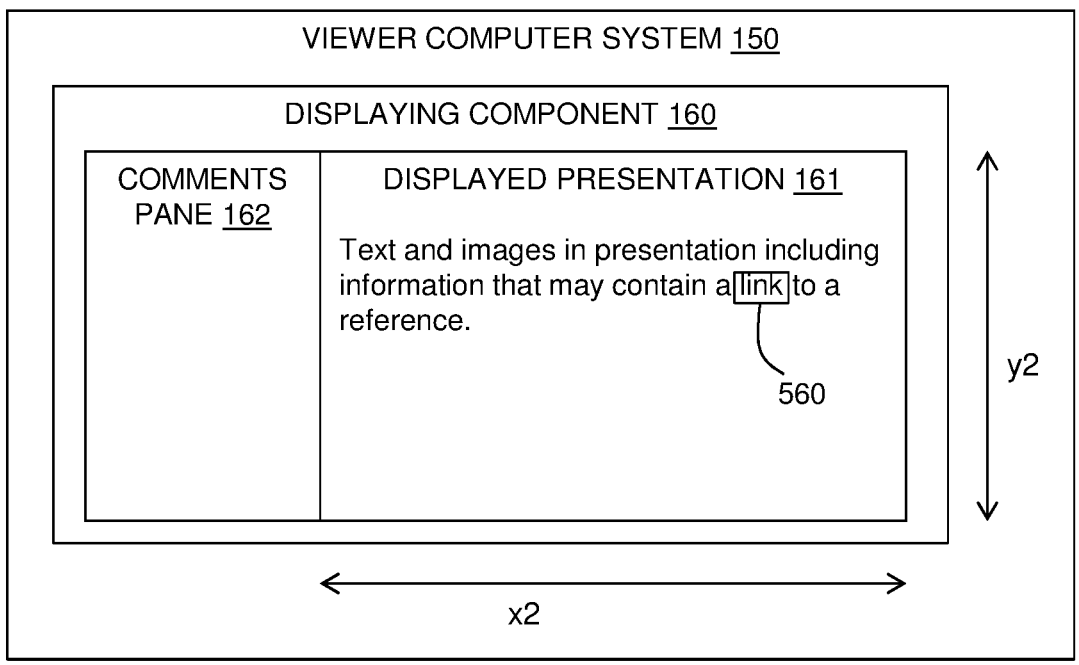

Referring to FIG. 5, an example embodiment is shown of a presentation 121 displayed on a presentation component 120 of a presenter computer system 110 and the corresponding displayed presentation 161 on a displaying component 160 of a viewer computer system 150. The presentation 121 is displayed in a resolution of x1 by y1 and includes a link 520 that is captured and provided to the viewers. In this example, the presentation 121 includes text 521 and the link 520 has an anchor area surrounding a word.

The displayed presentation 161 is displayed with a resolution of x2 by y2 with the corresponding link 560 provided by the described method in the corresponding location on the displaying component 160. The displaying component 160 may include a comments pane 162 for sending and receiving comments to and from the presenter and other participants in the presentation.

The calculation required to scale the size and position of the link overlay that is placed on top of the presentation is as follows.

The Presenter Side Window has the dimensions: x1=1920 Pixels, y1=1200 Pixels.

The position of the link is: Screen Link Position 700×550, Box Width: 100 Pixels, Box Height: 20 Pixels.

The Viewer Side Window has the dimensions: x2=1200 Pixels, y2=600 Pixels.

Screenshare Width(Pixels)/Resolution Width(Pixels)
=Width Scale Factor

Therefore, the Width Scale Factor in this example is
x2/x1=1200/1920=0.625

Screenshare Height(Pixels)/Resolution Height(Pixels)
=Height Scale Factor

Therefore, the Height Scale Factor in this example is
y2/y1=600/1200=0.50

Original Screen Link Position Horizontal*Width Scale Factor=New Screen Link Position Horizontal. Therefore, 700*0.625=437.5

Original Screen Link Position Vertical*Height Scale Factor=New Screen Link Position Vertical. Therefore, 550*0.5=275

The New Link Position=438×275 Pixels in the Viewer Side Window.

The size of the link box may also be calculated.

Box Width*Width Scale Factor=New Box Width→100*0.625=62.5

Box Height*Height Scale Factor=New Box Height→20*0.5=10

Figure 6:
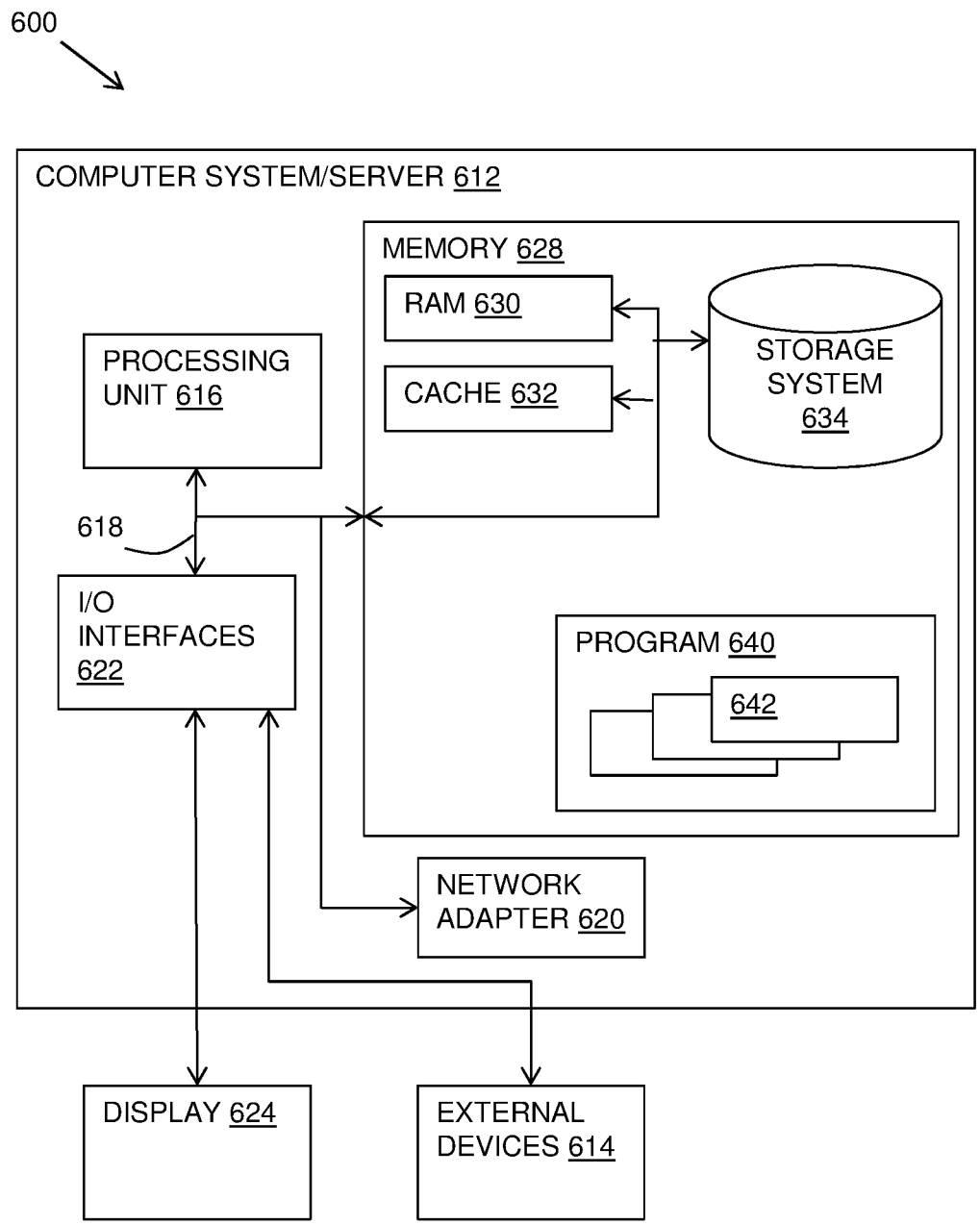
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
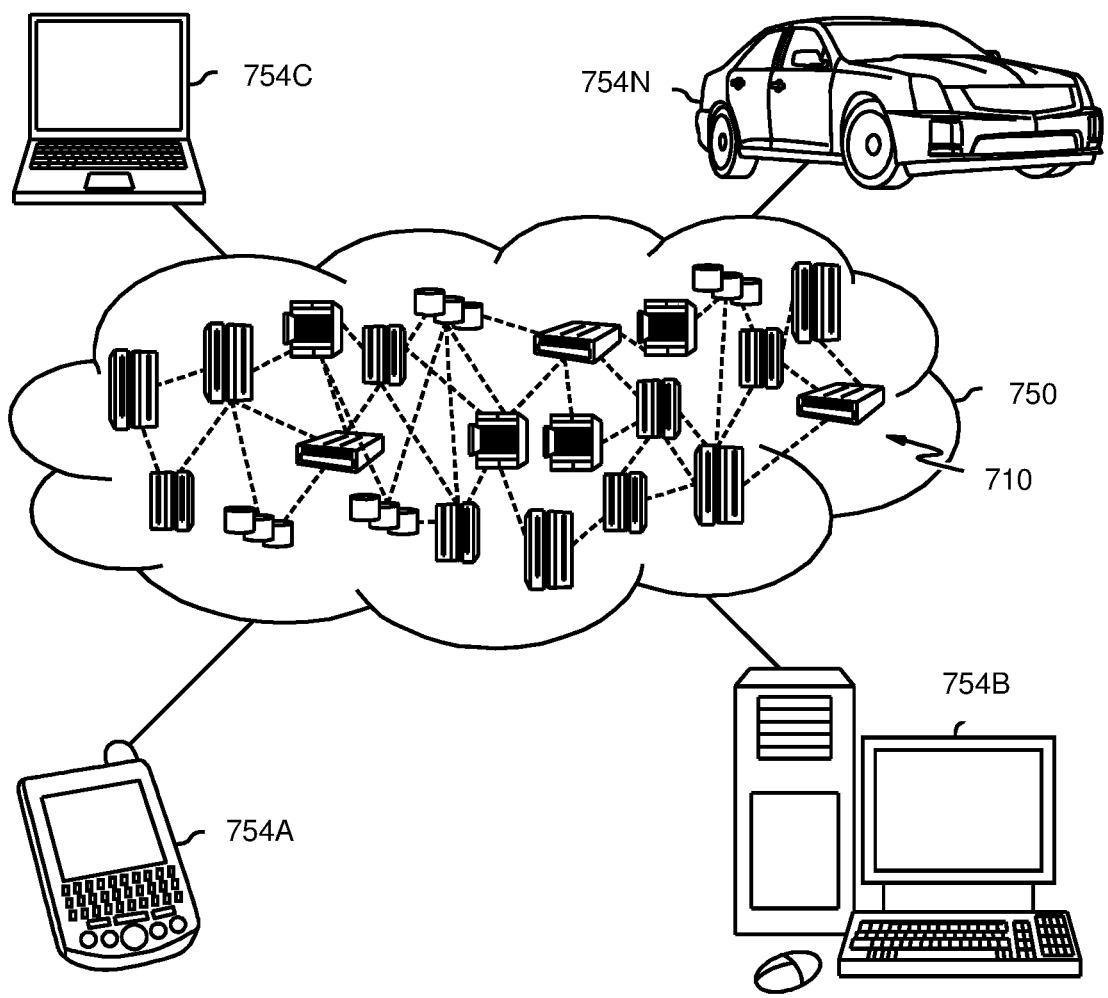
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
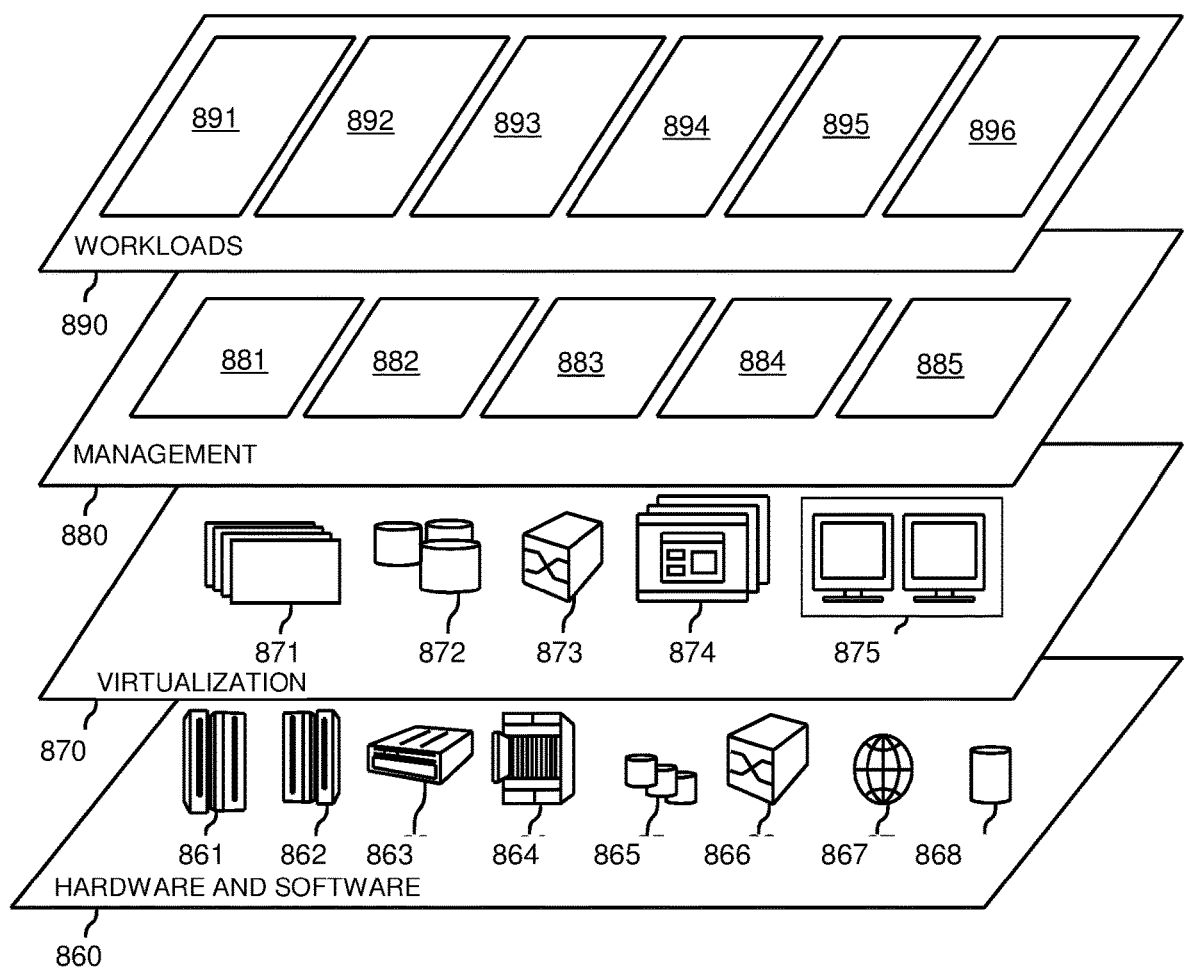
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and presentation processing for providing hyperlinks 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A system for providing hyperlinks in a live presentation to be viewed remotely, the system comprising a processor and a memory configured to provide computer program instructions to the processor, the program instructions are executed by the processor to cause the system to:
provide a live presentation capable of being transmitted in real time as presentation data to remote viewer computer systems, the live presentation comprising a display area showing a portion of a web page;
identify, during the live presentation, a first hyperlink of the web page that is viewable within the display area and a second hyperlink of the web page that is not viewable within the display area;
scrape, during the live presentation, the web page to obtain link information relating to the first hyperlink, the link information;
provide the link information for transmission in association with the presentation data to a remote client; and
obtain position information of the first hyperlink in the display area in order to display a hyperlink as an overlay of a remote display of the remote client,
wherein the position information is relative to a scale and aspect ratio of the display area.

2. The system as claimed in claim 1, wherein the link information is obtained for each updated display area content and the link information is transmitted sequentially with the presentation data for the updated display area content.

3. The system as claimed in claim 2, further comprising recording the live presentation and recording the sequentially transmitted link information with the presentation data.

4. The system as claimed in claim 1, further comprising providing a recorded presentation, and including a timestamp in the link information of a time in a duration of the recorded presentation at which the link is referenced.

5. The system as claimed in claim 1, wherein the presentation is a presentation of a web browser content and a web browser plugin provides the functionality of the link obtaining component, and the web browser plugin: scans open web browser content for all hyperlinks in the web browser content; and determines if each of the hyperlinks is visible in a current display area of the presentation.

* * * * *